United States Patent
Ishida

(10) Patent No.: US 7,631,208 B2
(45) Date of Patent: Dec. 8, 2009

(54) ELECTRONIC APPARATUS

(75) Inventor: Goro Ishida, Hara-machi (JP)

(73) Assignee: Seiko Epson Corporation, Tokyo (JP)

( * ) Notice: Subject to any disclaimer, the term of this patent is extended or adjusted under 35 U.S.C. 154(b) by 506 days.

(21) Appl. No.: 11/652,922

(22) Filed: Jan. 11, 2007

(65) Prior Publication Data

US 2007/0201076 A1    Aug. 30, 2007

(30) Foreign Application Priority Data

Jan. 11, 2006    (JP)    ............................. 2006-003859

(51) Int. Cl.
*G06F 1/32*    (2006.01)
(52) U.S. Cl. ...................................... 713/320; 713/323
(58) Field of Classification Search .................. 713/320, 713/323
See application file for complete search history.

(56) References Cited

U.S. PATENT DOCUMENTS 6,226,472 B1 *   5/2001   Yun ............................. 399/81
7,567,357 B2 *   7/2009   Kato et al. .................. 358/1.14

FOREIGN PATENT DOCUMENTS

| JP | 2002-232611 | 8/2002 |
| JP | 2002-300336 | 10/2002 |
| JP | 2004-96756 | 3/2004 |

\* cited by examiner

*Primary Examiner*—Nitin C Patel
(74) *Attorney, Agent, or Firm*—Nutter McClennen & Fish LLP; John J. Penny, Jr.

(57) ABSTRACT

A mode selector is operable to select either a first display mode or a second display mode. A controller is operable to cause each of a display and an operating section configured to perform a prescribed operation to be placed in either a first power mode in which a first level of power supplied from a power supply is consumed or a second power mode in which a second level of power supplied from the power supply which is lower than the first level is consumed, and operable to cause the display to display a first image in a case where the first display mode is selected, and to display a second image different from the first image in a case where the second display mode is selected. The controller is operable to cause the operating section to transit from the first power mode to the second power mode when the operating section does not perform the prescribed operation for a first time period. The controller is operable to cause the display to transit from the first power mode to the second power mode at least one of when the operating section does not perform the prescribed operation for a prescribed time period and when the actuator is not actuated for a prescribed time period. The controller is operable to disable the display from transiting from the first power mode to the second power mode in a case where the second display mode is selected.

10 Claims, 11 Drawing Sheets

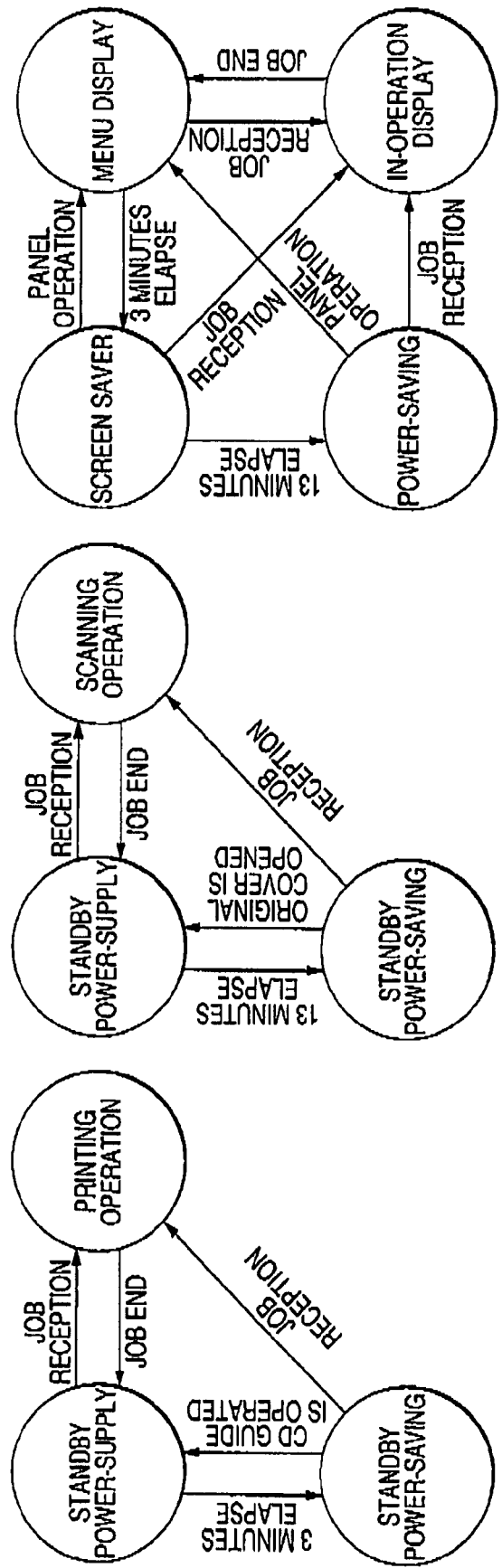

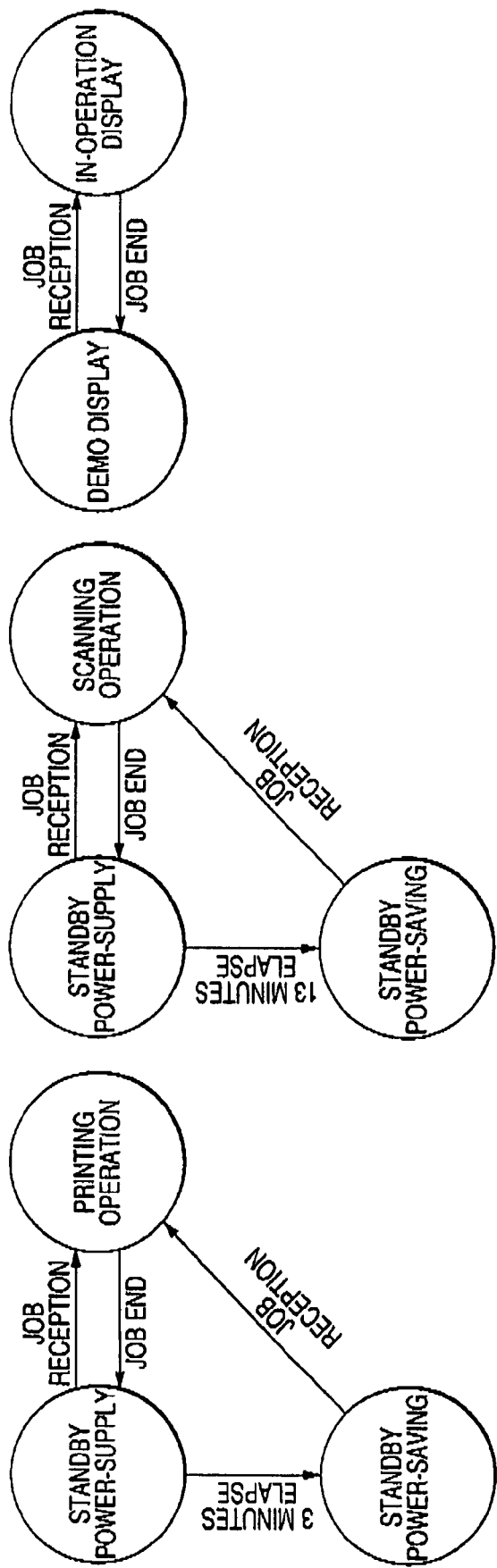

FIG. 6A

| | ACTIVATION | | 3 MINUTES LATER | 13 MINUTES LATER | | PRINT START | | PRINT END | 3 MINUTES LATER OF PRINT END | 13 MINUTES LATER OF PRINT END | ORIGINAL COVER OPERATION | | CD GUIDE OPERATION |
|---|---|---|---|---|---|---|---|---|---|---|---|---|---|
| PRINTER SECTION 12 | POWER-SUPPLY | | POWER-SAVING | | | PRINTING | | POWER-SUPPLY | POWER-SAVING | | | | POWER-SUPPLY |
| SCANNER SECTION 13 | POWER-SUPPLY | | | | | POWER-SAVING | | | | | POWER-SAVING | | |
| LCD 21 | MENU DISPLAY | | SCREEN SAVER | POWER-SAVING | | IN-PRINTING DISPLAY | | MENU DISPLAY | SCREEN SAVER | | | | |

FIG. 6B

| | ACTIVATION | | 3 MINUTES LATER | 13 MINUTES LATER | DEMO PRINT START | | PRINTING | DEMO PRINT END | 3 MINUTES LATER OF PRINT END | ORIGINAL COVER OPERATION | | CD GUIDE OPERATION |
|---|---|---|---|---|---|---|---|---|---|---|---|---|
| PRINTER SECTION 12 | POWER-SUPPLY | | POWER-SAVING | | | PRINTING | | | POWER-SUPPLY | POWER-SAVING | | |
| SCANNER SECTION 13 | POWER-SUPPLY | | | | | | | | | POWER-SAVING | | |
| LCD 21 | DEMO DISPLAY | | | | IN-PRINTING DISPLAY | | | | | DEMO DISPLAY | | |

FIG. 8A

| PRINTER SECTION 12 | ACTIVATION | POWER-SUPPLY | 2 MINUTES LATER | POWER-SAVING | 8 MINUTES LATER | | DEMO PRINT START | PRINTING | DEMO PRINT END | POWER-SUPPLY | 2 MINUTES LATER OF PRINT END | POWER-SAVING | | ORIGINAL COVER OPERATION | | CD GUIDE OPERATION |
|---|---|---|---|---|---|---|---|---|---|---|---|---|---|---|---|
| SCANNER SECTION 13 | | POWER-SUPPLY | | | | POWER-SAVING | | | | | | | | | |
| LCD 21 | | DEMO DISPLAY | | | | | | IN-PRINTING DISPLAY | | | DEMO DISPLAY | | | | |

FIG. 8B

| PRINTER SECTION 12 | ACTIVATION | POWER-SUPPLY | 2 MINUTES LATER | POWER-SAVING | DEMO PRINT START | PRINTING | DEMO PRINT END | POWER-SUPPLY | 2 MINUTES LATER OF PRINT END | POWER-SAVING | ORIGINAL COVER OPERATION | CD GUIDE OPERATION |
|---|---|---|---|---|---|---|---|---|---|---|---|---|
| SCANNER SECTION 13 | | | | POWER-SAVING | | | | | | | | |
| LCD 21 | | DEMO DISPLAY | | | | IN-PRINTING DISPLAY | | | | DEMO DISPLAY | | |

FIG. 9A

| PRINTER SECTION 12 | ACTIVATION | POWER-SUPPLY | POWER-SAVING | 2 MINUTES LATER | DEMO PRINT START | PRINTING | DEMO PRINT END | POWER-SUPPLY | 3 MINUTES LATER OF PRINT END | POWER-SAVING | ORIGINAL COVER OPERATION | CD GUIDE OPERATION |

- PRINTER SECTION 12: POWER-SUPPLY → POWER-SAVING (2 minutes later) → PRINTING (demo print start to demo print end) → POWER-SUPPLY → POWER-SAVING (3 minutes later of print end)
- SCANNER SECTION 13: POWER-SAVING throughout
- LCD 21: DEMO DISPLAY → IN-PRINTING DISPLAY → DEMO DISPLAY

FIG. 9B

- PRINTER SECTION 12: POWER-SUPPLY → POWER-SAVING (2 minutes later) → COPY PRINTING (copy start to copy end) → POWER-SUPPLY → POWER-SAVING (3 minutes later of copy print end)
- SCANNER SECTION 13: POWER-SAVING → COPY SCANNING → POWER-SUPPLY → POWER-SAVING (13 minutes later of copy scan end)
- LCD 21: DEMO DISPLAY → IN-COPYING DISPLAY → DEMO DISPLAY

FIG. 11

| | ACTIVATION | 2 MINUTES LATER | PANEL OPERATION | DEMO PRINT START | | DEMO PRINT END | 2 MINUTES LATER OF PRINT END | ORIGINAL COVER OPERATION | CD GUIDE OPERATION | PANEL OPERATION | 1 MINUTES LATER OF PANEL OPERATION |
|---|---|---|---|---|---|---|---|---|---|---|---|
| PRINTER SECTION 12 | POWER-SUPPLY | POWER-SAVING | | PRINTING | | POWER-SUPPLY | POWER-SAVING | | | | |
| SCANNER SECTION 13 | | | | | | | | | | | |
| LCD 21 | DEMO DISPLAY | | MENU DISPLAY | IN-PRINTING DISPLAY | | DEMO DISPLAY | | | | MENU DISPLAY | DEMO DISPLAY |

ELECTRONIC APPARATUS

BACKGROUND

1. Technical Field

The present invention relates to an electronic apparatus such as a printer or a hybrid machine having a display for displaying an operation menu and the like and having a power-saving function for effecting a power-saving mode after a prescribed time period elapses when the electronic apparatus is in a standby state without any operation.

2. Related Art

In a conventional electronic apparatus such as a printer or a hybrid machine, when one printing operation is finished, a standby power-supply mode is effected and when a prescribed time period elapses thereafter, it is effected a power-saving mode (standby power-saving mode) in which power consumption is smaller than the standby power-supply mode.

For example, Japanese Patent Publication No. 2002-300336A (JP-A-2002-300336) discloses a hybrid machine having a printer section and a scanner section. In such a hybrid machine, the printer section and the scanner section are individually shifted to a power-saving mode. For example, when a prescribed time period elapses after the printer section finishes a printing operation, the printer section is shifted to a power-saving mode from a standby power-supply mode. Then, when the hybrid machine receives a print job, the printer section is shifted to a printing mode from the power-saving mode, but the scanner section is kept in the power-saving mode.

Recently, printers or hybrid machines which can print song titles and the like on a label surface of a CD as a printing medium other than sheets of paper are on the market. Such hybrid machines are provided with a CD guide for allowing a CD adapter for loading a CD to be mounted to the printer section. Accordingly, the CD guide is opened at the time of loading the CD. When the operation of the CD guide is sensed by a sensor, the printer section is shifted to the standby power-supply mode from the power-saving mode.

On the other hand, the scanner section includes an original table on which an original to be scanned is placed, an original cover, and an original cover sensor for sensing the opening operation of the original cover. When a prescribed time period elapses after the scanner section finishes a scanning operation, the scanner section is shifted to the power-saving mode from the standby power-supply mode. In the power-saving mode, when a sensor senses the opening operation of the original cover, the scanner section is restored to the standby power-supply mode. It takes a prescribed time period for a CCD or a lamp as a reader of the scanner section to become a stable state in which it can perform the scanning operation with prescribed precision. Accordingly, the start of the scanning operation is preliminarily sensed (predicted) on the basis of the operation of the original cover, thereby rapidly supplying power to the scanner section.

The hybrid machine is provided with a liquid crystal display (LCD) as a display for displaying a menu screen or the like. When a prescribed time period elapses after the printer section or the scanner section shifts to the standby power-supply state, the liquid crystal display shifts to a screen saver state, and for example, when a prescribed time period elapses thereafter, the liquid crystal display is shifted to a power-saving mode so as to turn off the screen.

Japanese Patent Publication No. 2004-96756A (JP-A-2004-96756) discloses a technique for displaying a demo image on a display (an image display) of a digital camera. That is, the technique includes a step of starting a demo mode displaying features and functions of the digital camera on the image display and a step of giving a demonstration when a user's input is not detected at all. The technique includes a step of finishing the demonstration when the user's input is detected, a step of enabling a normal use of the image display, and a step of automatically restarting the demonstration when a prescribed time period elapses in the state where the user's input is not detected.

When the hybrid machines or the printers (hereinafter, referred to as hybrid machines, etc.) are in a store, a demo printing operation is often performed to show performances of the hybrid machines to customers. Even when the demo printing operation is not performed, it is effective for attracting attention of the customers to display demo images such as advertisement texts or advertisement illustrations on the screen of a liquid crystal display so as to show performances of the hybrid machines, etc. to the customers.

However, when the conventional hybrid machine exhibited in a store is in a demo display state, the hybrid machine is shifted to the power-saving mode in the same order as a normal mode. Accordingly, when a prescribed time period elapsed without any operation after the hybrid machine shifts to the demo display state, the hybrid machine is shifted to the power-saving mode to be in a power-saving display state in which the screen is turned off from the demo display state. In this case, since the demo display is stopped for a prescribed time period, it is not possible to obtain an effect of sufficient advertisement.

Even when the hybrid machine performs a demo display and there is no possibility that another function such as a printing function or a scanning function is performed, the hybrid machine is restored to the standby power-supply mode from the power-saving mode in the same order as the normal mode, thereby uselessly increasing the power consumption in the demo display. For example, it is assumed that a customer having visited the store to watch the hybrid machine operates the CD guide. Then, although the hybrid machine performs the demo display and no printing operation will be performed, the printer section is shifted to the standby power-supply mode from the power-saving mode. When the customer opens the original cover, the opening operation is sensed by a sensor and the scanner section is restored to the standby power-supply mode from the power-saving mode. Accordingly, although the hybrid machine performs the demo display and a specific printing operation such as an operation of printing a label on a CD and a scanning operations will not be performed, the customer's operation is sensed and the hybrid machine is restored to the standby power-supply mode from the power-saving mode, thereby uselessly consuming power by the standby power supply. Specifically, when the hybrid machine exhibited in the store gives a demo illustration, the liquid crystal display consumes power to give the demo illustration such as advertisements for business hours from the opening time of the store to the closing time. Therefore, there is a need for suppressing unnecessary power consumption in operations other than the demo display as small as possible. The power-saving mode is not mentioned in the digital camera disclosed in JP-A-2004-96756 and thus another countermeasure is required for the power-saving function.

SUMMARY

It is therefore one advantageous aspect of the invention to provide an electronic apparatus provided with a display and capable of appropriately performing a demo display even if the electronic apparatus is provided with a power saving function.

According to one aspect of the invention, there is provided an electronic apparatus, comprising:
- a power supply;
- a display;
- an actuator, adapted to be actuated by an operator;
- an operating section, configured to perform a prescribed operation;
- a mode selector, operable to select either a first display mode or a second display mode; and
- a controller, operable to cause each of the display and the operating section to be placed in either a first power mode in which a first level of power supplied from the power supply is consumed or a second power mode in which a second level of power supplied from the power supply which is lower than the first level is consumed, and operable to cause the display to display a first image in a case where the first display mode is selected, and to display a second image different from the first image in a case where the second display mode is selected, wherein:

the controller is operable to cause the operating section to transit from the first power mode to the second power mode when the operating section does not perform the prescribed operation for a first time period;

the controller is operable to cause the display to transit from the first power mode to the second power mode at least one of when the operating section does not perform the prescribed operation for a prescribed time period and when the actuator is not actuated for a prescribed time period; and the controller is operable to disable the display from transiting from the first power mode to the second power mode in a case where the second display mode is selected.

The controller may be operable to cause the operating section to transit from the first power mode to the second power mode when the operating section does not perform the prescribed operation for a second time period shorter than the first time period, in a case where the second display mode is selected.

The controller may be operable to cause the operating section to transit from the first power mode to the second power mode when a second time period shorter than the first time period is elapsed after the electronic apparatus is activated, in a case where the second display mode is selected.

The prescribed operation may be a printing operation with respect to either a sheet medium or a disk medium.

The actuator may include a member operable to perform the printing operation with respect to the disk medium. The controller may be operable to cause the operating section to transit from the second power mode to the first power mode when the member is actuated, in a case where the first display mode is selected. The controller may be operable to disable the operating section from transiting from the second power mode to the first power mode even when the member is actuated, in a case where the second display mode is selected.

The prescribed operation may be a scanning operation with respect to an original.

The controller may be operable to cause the operating section to transit from the first power mode to the second power mode immediately after the second display mode is selected.

The actuator may include a cover adapted to hold the original. The controller may be operable to cause the operating section to transit from the second power mode to the first power mode when the cover is actuated, in a case where the first display mode is selected. The controller may be operable to disable the operating section from transiting from the second power mode to the first power mode even when the cover is actuated, in a case where the second display mode is selected.

The actuator may include a switch provided in a control panel together with the display. The controller may be operable to cause the display to display the first image when the switch is actuated, even in a case where the second display mode is selected.

The controller may be operable to cause the display to display the second image when the switch is not actuated for a prescribed time period while the first image is displayed.

BRIEF DESCRIPTION OF THE DRAWINGS

FIGS. 4A to 4C are diagrams respectively showing state transitions of a printer section, a scanner section and an LCD of the hybrid machine in a normal mode.

FIGS. 5A to 5C are diagrams respectively showing state transitions of the printer section, the scanner section and the LCD of the hybrid machine in a demo display mode.

FIG. 6A is a table chronologically showing state transitions of the hybrid machine in the normal mode.

FIG. 6B is a table chronologically showing state transitions of the hybrid machine in the demo display mode.

FIG. 8A is a table chronologically showing state transitions of the hybrid machine (the second embodiment) in the demo display mode.

FIG. 8B is a table chronologically showing state transitions of a hybrid machine (a modified example of the second embodiment) in the demo display mode.

FIGS. 9A and 9B are tables chronologically showing state transitions of a hybrid machine according to a third embodiment of the invention in the demo display mode.

FIG. 11 is a table chronologically showing state transitions of the hybrid machine (the fourth embodiment) in the demo display mode.

DETAILED DESCRIPTION OF THE EXEMPLARY EMBODIMENTS

Exemplary embodiments of the invention will be described below in detail with reference to the accompanying drawings.

Figure 1:
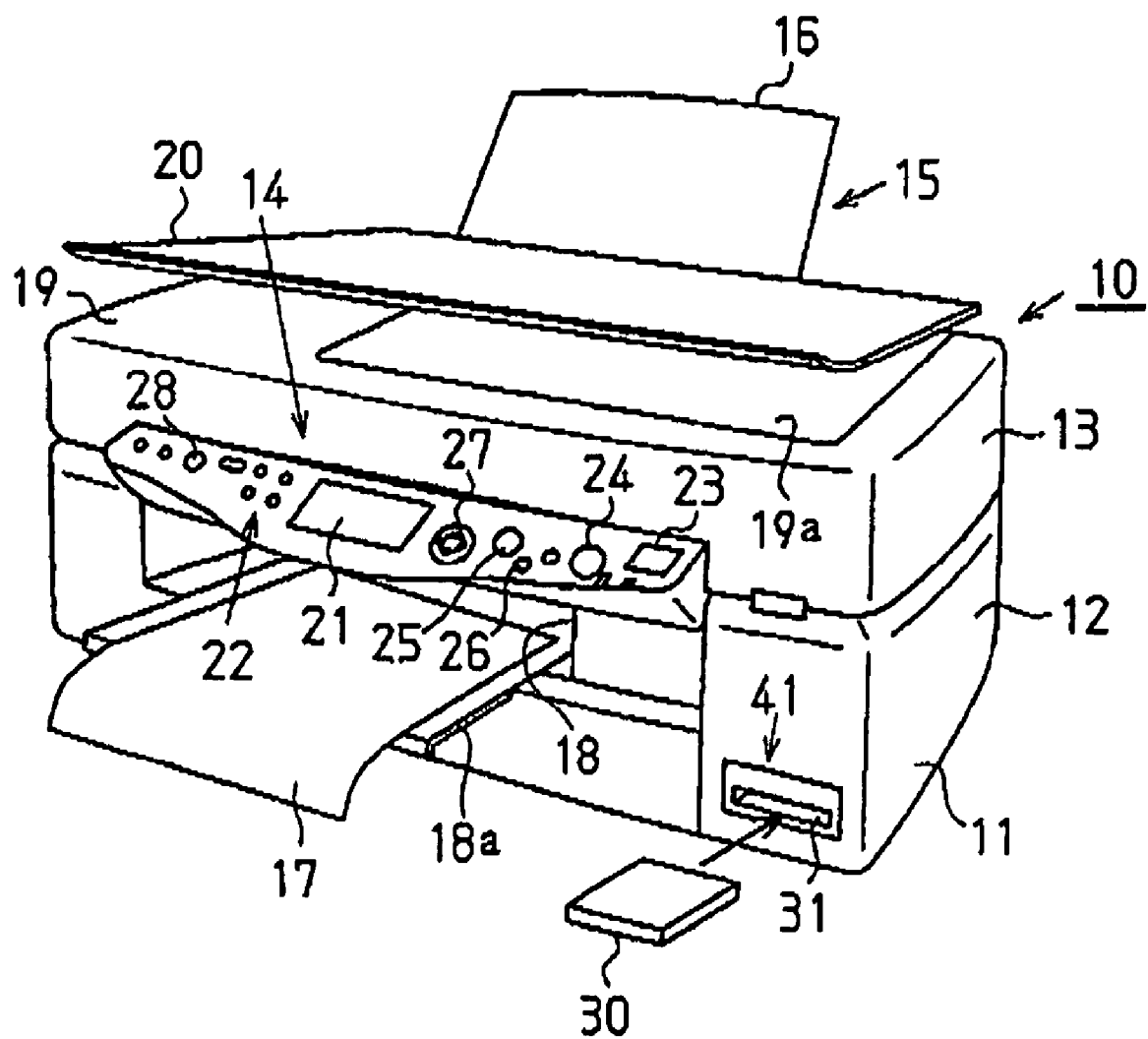
FIG. 1 is a perspective view showing a hybrid machine according to a first embodiment of the invention.

As shown in FIG. 1, a hybrid machine 10 according to a first embodiment of the invention has a plurality of functions such as a scanner function, a printer function, and a copy function. The hybrid machine 10 includes a printer section 12 disposed in a lower portion of a main body 11 so as to print an image based on image data on a medium such as a sheet of paper and a scanner section 13 disposed in an upper portion of the main body 11 so as to acquire image data by scanning an image of a document or a photographed film. A control panel 14 which is operated by a user is disposed at the center of a front face of the main body 11. The hybrid machine 10 performs a copy function by allowing an image processor to convert image data scanned by the scanner section 13 into print data and allowing the printer section 12 to print an image based on the print data on a sheet of paper.

A sheet supplying section 15 for supplying sheets of paper to the printer section 12 is disposed on the rear face of the hybrid machine 10 and a sheet tray 16 for setting cut sheets of paper (not shown) is disposed in the sheet supplying section 15. A sheet ejecting section 18 for ejecting sheets of paper 17 on which the printer section 12 performs a printing operation is disposed in the lower portion of the front face of the hybrid machine 10 and a tray 18a for receiving the sheets of paper 17 is disposed in the sheet ejecting section 18.

The printer section 12 has a configuration capable of printing a color image and employs an ink jet technique for forming an image by ejecting seven colors of ink, for example, cyan (C), light cyan (LC), magenta (M), light magenta (LM), yellow (Y), dark yellow (DY), and black (K) onto a medium and forming dots thereon.

The top of the scanner section 13 is provided with an original table 19 into which an original table glass 19a having a prescribed size (for example, A4 size) on which an original to be scanned can be placed is fitted. In addition, an original cover 20 used to press a document or a photographed film placed on the original table glass 19a at the time of scanning the document or the photographed film is disposed on the original table 19 so as to be opened and closed.

The control panel 14 includes a liquid crystal display (hereinafter, referred to as "LCD 21") disposed substantially at the center thereof and an operating section 22 having a plurality of operation buttons disposed on both sides of the LCD 21. The LCD 21 serves to display a menu for showing setting items or setting conditions in texts or to display an image such as an image scanned by the scanner section 13. The operating section 22 has a power switch 23, a print start switch 24, a color copy switch 25, a monochrome copy switch 26, and a selection switch 27 (cross keys) disposed on the right side of the LCD 21 and also includes a scan switch 28 and the like disposed on the left side of the LCD 21.

A memory card slot (hereinafter, referred to as "slot 31") for loading a memory card 30 is disposed in the lower portion of the front face of the main body 11. The hybrid machine 10 has a function of allowing the printer section 12 to print an image based on image data read from the memory card 30 loaded into the slot 31 or storing image data scanned from an original by the scanner section 13 in the memory card 30. The hybrid machine 10 serves as a printer which can be connected to a host computer (PC) not shown so as to perform a printing operation on the basis of print data transmitted from the host computer. The LCD 21 can display the image read from the memory card 30. In this embodiment, the LCD 21 is a color liquid crystal display which can perform a full color display.

Figure 2:
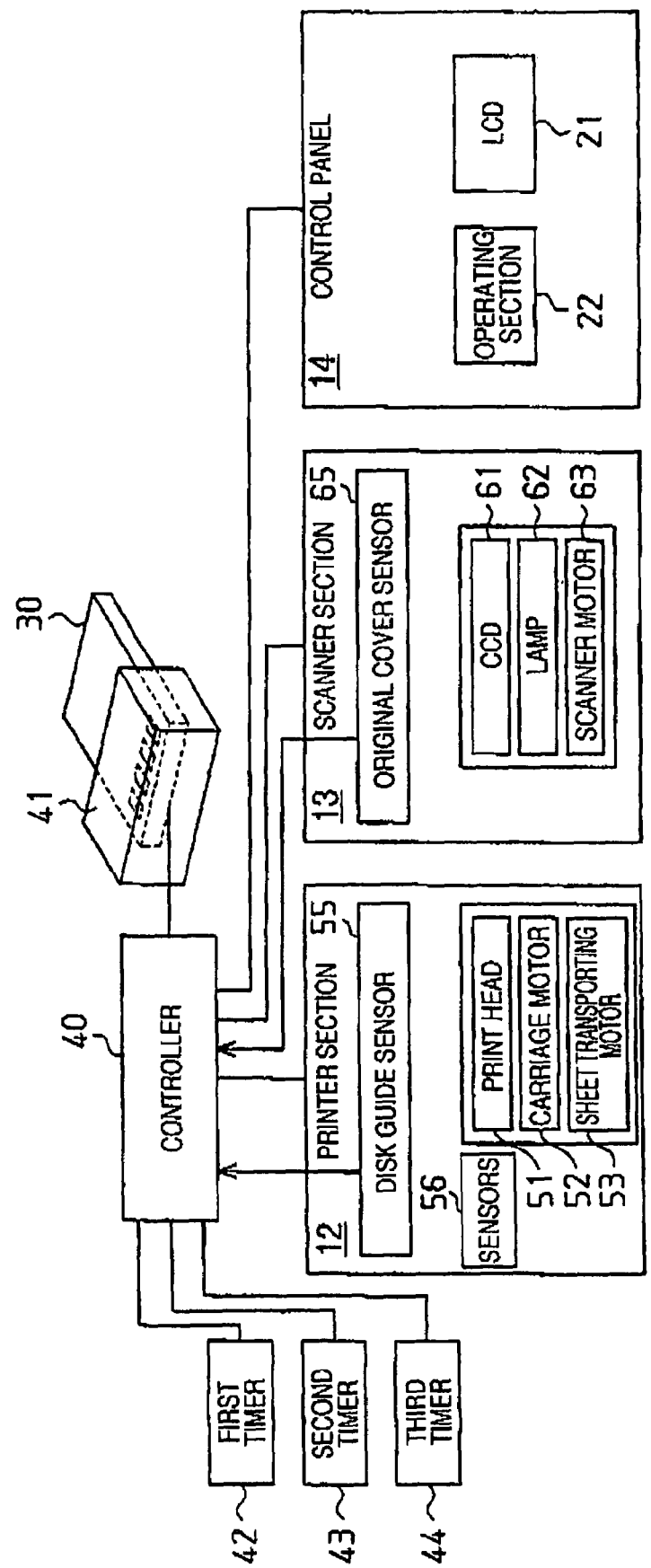
FIG. 2 is a block diagram showing an electrical configuration of the hybrid machine.

As shown in FIG. 2, the hybrid machine 10 includes the printer section 12, the scanner 13, the control panel 14, a controller 40 for controlling them, a memory card reader 41 for reading/recording data from/to the memory card 30, a first timer 42, a second timer 43, and a third timer 44. The printer section 12 and the scanner section 13 constitute a driver including driving mechanisms, sensors, and the like for performing printer operations and scanner operations. Image processings such as generation of print data used for the operation of the printer section 12 or generation of image data from the image signals scanned by the scanner section 13 are performed by an image processor of the controller 40. The controller 40 allows the printer section 12 to perform a printing operation on the basis of the print data acquired from the host computer or the image data read from the memory card 30 In accordance with various operations of the operating section 22, allows the scanner section 13 to perform a scanning operation on the basis of various operations of the operating section 22, or allows the LCD 21 to perform a display operation.

The printer section 12 includes a driving mechanism 54 having a print head 51 for ejecting ink, a carriage motor 52 allowing a carriage (not shown) mounted with the print head 51 to reciprocate in a primary scanning direction (width direction of the hybrid machine), and a sheet transporting motor 53 for driving a transporting roller operable to transport a sheet of paper in a secondary scanning direction (sheet transporting direction). For example, a stepping motor or a DC motor is used as the carriage motor 52 or the sheet transporting motor 53.

The printer section 12 supports a direct printing operation on a label surface of a CD/DVD and a disk guide (not shown) to which an exclusive disk tray for loading a disk such as a CD/DVD is attached is disposed in the front face or the rear face of the main body. The disk guide is operated to load the disk at the time of printing a label on the disk such as a CD/DVD. The printer section 12 Includes a disk guide sensor 55 for sensing a user's operation of the disk guide (hereinafter, referred to as "CD guide operation") (prescribed operation). The printer section 12 includes, for example, a contact or optical sensor for detecting an end of a sheet of paper to control an end position of the sheet, a linear encoder for detecting a displacement of a carriage, and the like as other sensors 56.

The scanner section 13 includes a scanning unit having a CCD 61 (charge coupled device) for scanning an image of an original and a lamp 62 for irradiating light to a scanning position and a driving mechanism 64 having a scanner motor 63 such as an electric motor for scanning (moving) the scanning unit. The scanner section 13 Includes an original cover sensor 65 for detecting an opening operation of the original cover 20, a light emitter (not shown) for irradiating light to a photograph film at the time of scanning an image of the photograph film, and a position detecting sensor (not shown) of the scanning unit.

When the scanner section 13 performs a scanning operation of scanning an original placed on the original table glass 19a, the image of the original is read by irradiating light through the original table glass 19a from the lamp 62 disposed inside the scanner section 13 and detecting reflected light from the original by the use of the CCD 61. RGB outputs of the CCD 61 are input to the controller 40 through an A/D converter and are generated as image data having multi RGB values by the controller 40.

The control panel 14 includes the operating section 22 (operation switch group) and the LCD 21, as described above.

The controller 40 includes an ASIC provided with a CPU, a ROM, a RAM, and a variety of interfaces. The ASIC includes a CPU, an image processor, printer system drivers (a motor driver and a print head driver), scanner system drivers (a CCD driver, a lamp driver, and a motor driver), and an LCD driver. The CPU operates on the basis of a control program stored in the ROM and generally takes charge of printing control, scanning control, and display control. The image processor analyzes commands of print data (PRN data) received from the host computer to perform a development process of developing the print data into printable raster data. The image processor also performs an image process (color conversion, halftoning, micro weaving, and the like) of converting image data scanned and acquired by the scanner section 13 when a copy function is carried out or image data acquired from the memory card 30 when a direct printing operation is carried out into print data. The motor driver drives the carriage motor and a sheet transporting motor on the basis of a command signal from the CPU to control the scanning of the carriage and the transport of the paper. The print head driver drives the print head 51 on the basis of image forming data processed by the image processor and sequentially stored in the RAM to control the ejection of ink. The LCD driver controls the display of the LCD 21 on the basis of display data transmitted from the RAM in accordance with a command from the CPU.

In this way, the controller 40 drives and controls the printer section 12 by the use of various drivers at the time of performing a printing operation and drives and controls the scanner section 13 in accordance with scanner conditions set by the control panel 14 at the time of performing a scanning operation. The controller 40 performs an image display processing; of reading image data from the memory card 30 and displaying an image at the time of performing a direct printing operation, to the LCD 21 by the use of the LCD driver on the basis of operations of the switches in the operating section 22, in addition to the menu screen display control such as menu screen display, menu screen change, cursor movement, and increase and decrease in set values. In this embodiment, by employing the image display function, it is possible to insert the memory card 30 storing a demo display instructing file and image data into the slot 31 and to display a demo image on the LCD 21.

In the state where power is supplied to the hybrid machine 10, voltages from a power supply not shown is supplied to the drivers of the controller 40 and the voltages (driving voltages) supplied to the printer section 12, the scanner section 13, and the LCD 21 from the drivers by allowing the CPU to send control signals to the drivers. The power supply generates a primary voltage (for example, a voltage in the range of 30 to 60 volts) by transforming and rectifying a commercial AC voltage and generates a secondary voltage (for example, a voltage in the range of 15 to 25 volts) by dropping the primary voltage. The primary voltage is mainly supplied to the electric motor through the motor driver and the secondary voltage is supplied to the print head 51 and the lamp 62 through the drivers. An output voltage (for example, a voltage in the range of 3 to 6) generated by dropping the secondary voltage is supplied to a sensor system and a control system (including the CPU). The controller 40 can individually control the voltages (driving voltages) supplied to the printer section 12, the scanner section 13, and the LCD 21.

The controller 40 can allow individually switch printer section 12, the scanner section 13, and the LCD 21 between an operating state and a standby state by individually controlling the voltages (driving voltages) supplied thereto. There are two kinds of standby states: one is a "standby power-supply" state (standby power-supply mode) which is a standby state but a power is supplied so as to be able to start an operation immediately and the other is a "standby power-saving" state (power-saving mode) in which the power supply is stopped to be in a standby state for the purpose of saving power when the standby power-supply state continues for a prescribed time period. The controller 40 manages power states such as the "operating state", the "standby power-supply state", the "standby power-saving state", and the like and individually manages the power states of the printer section 12, the scanner section 13, and the LCD 21 in accordance with prescribed rules (state transition requirements) programmed in advance. The controller 40 has two kinds of modes of a "normal mode" and a "demo display mode" and the state transition requirements (see FIGS. 4A through 5C) are individually set for the two modes.

When an elapsed time period is set as a change condition for changing any one state to another state such as when the "standby power-supply" state is shifted to the "standby power-saving" state so as to perform the state transition control, the controller 40 uses the first timer 42, the second timer 43, and the third timer 44 to manage the elapsed time period. The first timer 42, the second timer 43, and the third timer 44 manage the elapsed time period as the state transition requirements of the printer section 12, the scanner section 13, and the LCD 21. When the first to third timers 42 to 44 receive a time counting instruction from the controller 40, they count the instructed time period and when the instructed time period elapses, they notify to the controller 40 that the instructed time period has elapsed.

Figure 3:
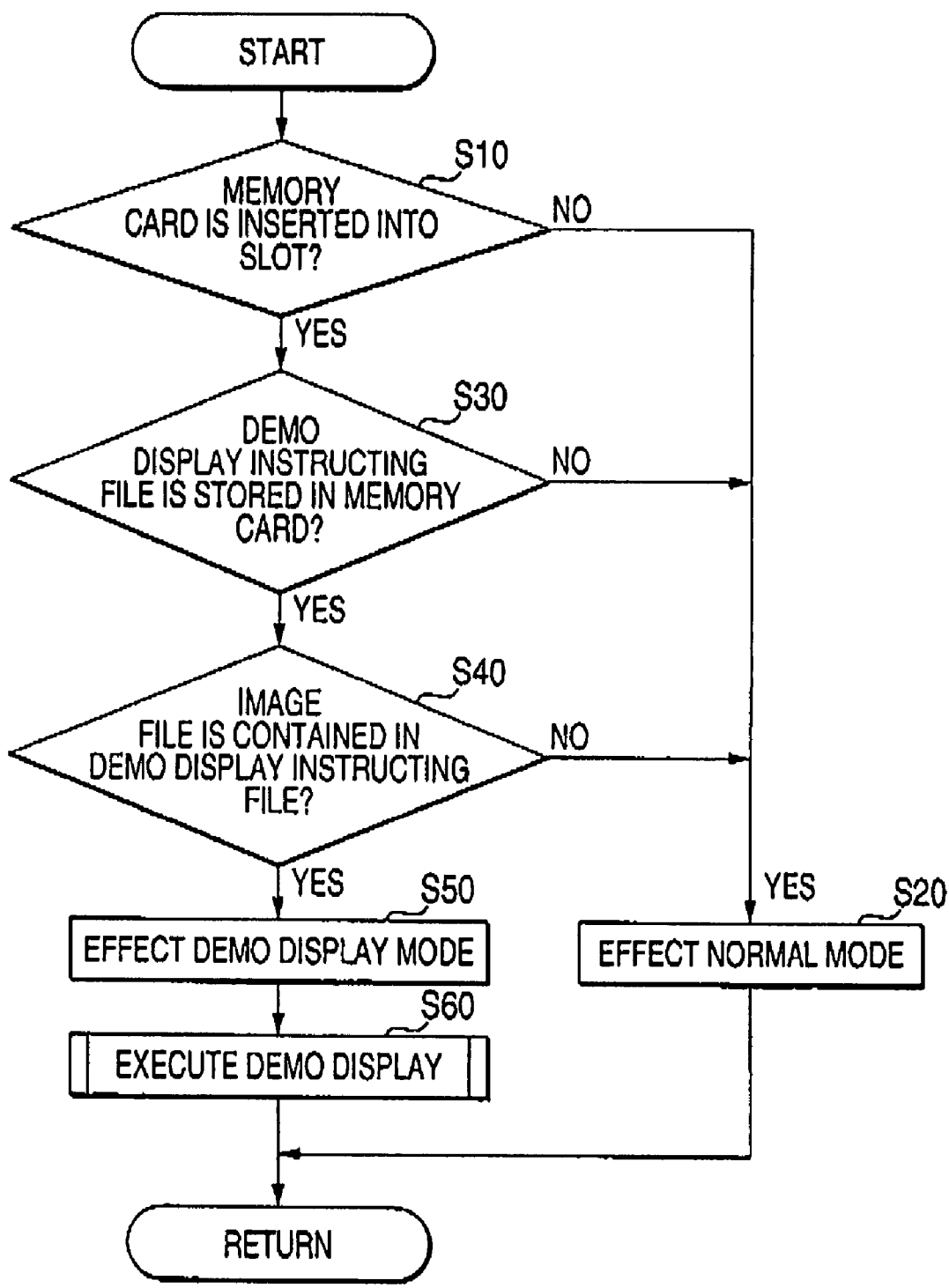
FIG. 3 is a flowchart showing a mode selection processing executed in the hybrid machine.

FIG. 3 is a flowchart illustrating a mode selection program executed by the CPU of the controller. The CPU of the controller 40 selects the "normal mode" or the "demo display mode" by executing the mode selection program stored in the ROM. Hereinafter, a mode selection processing performed by the CPU will be described with reference to the flowchart shown in FIG. 3.

First, it is judged in step S10 whether the memory card 30 is inserted. When it is judged that the memory card 30 is inserted into the slot 31, the processing of step S30 is performed and when it is judged that the memory card is not inserted into the slot, the "normal mode" is effected in step S20. For example, the CPU has a flag for storing a current mode. The flag is set to "0" in the "normal mode" and the flag is set to "1" in the "demo display mode."

In step S30, it is judged whether a "demo display instructing file" is stored in the memory card 30. When it is judged that the "demo display instructing file" exists, the processing of step S40 is performed and when it is judged that the "demo display instructing file" does not exist, the "normal mode" (flag=0) is effected in step S20.

Next, in step S40, it is judged whether an "image file" is stored in the memory card 30. When it is judged that the "image file" exists, the processing of step S50 is performed and when it is judged that the "image file" does not exist, the "normal mode" (flag=0) is effected in step S20.

In step S50, the demo display mode is effected. That is, the CPU sets the flag to "1" which indicates the demo display mode.

In step S60, the demo display processing is executed. That is, commands indicating a display order of the image file and display times of the images are included in the demo display instructing file and the images of the designated image file are sequentially displayed on the screen of the LCD 21 in accordance with the commands. For example, when there are N image files, images 1 to N are displayed on the screen for the designated display times in the instructed order in one turn and images 1 to N are repetitively displayed from the first image again, thereby continuously performing a kind of slide show. The images include explanation texts or illustrations for explaining performances or features of the hybrid machines 10. An animation may be displayed by displaying a series of images in the unit of frame.

In this way, the controller 40 (CPU) can recognize whether the current mode is the normal mode or the demo display mode only by watching the flag, thereby managing the power states in accordance with the state transition requirements corresponding to the mode.

FIGS. 4A to 4C show state transition diagrams in the normal mode and FIGS. 5A to 5C show state transition diagrams in the demo display mode. The state transition requirements expressed by the state transition diagrams are stored as programs in the ROM of the controller 40 and the CPU of the controller 40 manages the power states of the printer section 12, the scanner section 13, and the LCD 21 in accordance with the conditions corresponding to the mode at that time by executing the program corresponding to the mode at that time.

First, the state transition requirements of the printer section 12, the scanner section 13, and the LCD 21 in the "normal mode" shown in FIGS. 4A to 4C will be described. First, as shown in FIG. 4A, the states of the printer section 12 include three states of "standby power-saving", "standby power-supply", and "printing operation".

As shown in FIG. 4B, the states of the scanner section 13 include three states of "standby power-saving", "standby power-supply", and "printing operation". As shown in FIG. 4C, the states of the LCD 21 include four states of "power-saving", "screen saver", "menu display", and "in-operation display."

First, in the state transition of the printer section 12, as shown in FIG. 4A, when a job is received in the "standby power-saving" state or the "standby power-supply" state, the printer section is shifted to the "printing operation" state. When the "printing operation" is finished and the job is ended, the printer section is shifted to the "standby power-supply" state. When three minutes elapse in the "standby power-supply" state, the printer section is shifted to the "standby power-saving" state. When an operation (prescribed operation) of the CD guide is detected by the disk guide sensor 55 in the "standby power-saving" state, the printer section is shifted to the "standby power-supply" state.

Next, as shown in FIG. 4B, in the state transition of the scanner section 13, the scanner section is shifted to the "scanning operation" state when a job is received in the "standby power-saving" state or the "standby power-supply" state. When the "scanning operation" is finished and the job is ended, the scanner section is shifted to the "standby power-supply" state from the "scanning operation" state. When 13 minutes elapse in the "standby power-supply" state, the scanner section is shifted to the "standby power-saving" state. When the opening operation of the original cover 20 is detected by the original cover sensor 65 in the "standby power-saving state, the scanner section is shifted to the "standby power-supply" state.

Next, as shown in FIG. 4C, in the state transition of the LCD 21, when print data is received from, for example, the host computer in the "power-saving" state and a job is received, the LCD is shifted to the "in-operation display" state. The "in-operation display" means that a text or illustration is displayed on the LCD 21 in printing or in scanning. In this case, for example, a text or illustration of "in printing" or a text or illustration "in scanning" is displayed. When the job is ended in the "in-operation display" state, the LCD is shifted to the "menu display" state. When the panel operation of the operating section 22 is detected in the "power-saving" state, the LCD is shifted to the "menu display" state. When a print start operation is performed by the control panel 14 or a print job is received from the host computer to receive a job in the "menu display" state, the LCD is shifted to the "in-operation display" state. When 3 minutes elapse in the "menu display" state, the LCD is shifted to the "screen saver" state. When 13 minutes elapse in the "screen saver" state, the LCD is shifted to the "power-saving" state. When the panel operation is detected in the "screen saver" state, the LCD is shifted to the "menu display" state. The "screen saver" is performed to show performances such as fineness of images and clearness of colors of the LCD 21 or preventing deterioration of the screen.

Next, the state transition requirements of the printer section 12, the scanner 13, and the LCD 21 in the "demo display mode" shown in FIGS. 5A to 5C will be described. Since the most state transition requirements are the same as the "normal mode", particularly differences will be mainly described.

In the state transition of the printer section 12, as shown in FIG. 5A, even when the operation of the CD guide is detected by the disk guide sensor 55 in the "standby power-saving" state, the "standby power-saving" state is maintained without being shifted to the "standby power-supply" state. In the other cases, the state transition is similar to that in the normal mode.

Next, in the state transition of the scanner section 13, as shown in FIG. 5B, even when the open state of the original cover 20 is detected by the original cover sensor 65 in the "standby power-saving" state, the "standby power-saving" state is maintained without being shifted to the "standby power-supply" state. In the other cases, the state transition is similar to that in the normal mode.

Next, the state transition of the LCD 21 Includes only two states of the "demo display" and the "in-operation display", as shown in FIG. 5C. That is, the two states of the "power-saving" state and the "menu display" state do not exist. When the print start operation is performed by the control panel in the "demo display" state to receive a job, the LCD is shifted to the "in-operation display" state. Here, the "in-operation display" in the demo display mode is a demo display displayed on the LCD 21 in printing or in scanning. In this case, unlike the "in-operation display" in the normal mode, a demo screen is displayed. Specifically, a demo image associated with performances or features to be shown to customers who are interested in the hybrid machine 10 and who try to perform the demo printing operation, etc. is displayed as a demonstration. When any time elapses in the "demo display" state, the "demo display" state is maintained without being shifted to the "power-saving" state.

Next, how the states are shifted in the "normal mode" and the "demo display mode" with the lapse of time after the activation will be described with reference to FIGS. 6A and 6B. In the figures, the "standby power-supply", the "standby power-saving", and the "printing operation" are briefly referred to as the "power-supply", the "power-saving", and the "printing", respectively.

First, the "normal mode" will be described. For example, when the activation in the state where the memory card is not inserted into the slot 31, the hybrid machine 10 is initiated in the "normal mode." As shown in FIG. 6A, right after the activation, the printer section 12 and the scanner section 13 are all in the "standby power-supply" state and the LCD 21 is in the "menu display" state. When 3 minutes elapse after the activation, the printer section 12 shifts to the "standby power-saving "state and the LCD 21 shifts to the "screen saver" state. Then, when 13 minutes elapse after the activation, the scanner section 13 shifts to the "standby power-saving" state and the LCD 21 shifts to the "standby power-saving" state. Thereafter, when a print job is received and a printing operation is started, the printer section 12 shifts to the "printing operation" state, the LCD 21 shifts to the "in-printing display" state, and the scanner section 13 is maintained in the "standby power-saving" state. The in-printing display state in the normal mode indicates that the hybrid machine is in printing. The image files for the in-printing display are stored in advance in the ROM of the controller 40 and the in-printing display is performed by reading the image files.

When the printing operation is finished, the printer section 12 is shifted to the "standby power-supply" state and the LCD 21 is shifted to the "menu display" state. When 3 minutes elapse after the printing operation is finished, the printer section 12 is shifted to the "standby power-saving" state and the LCD 21 is shifted to the "screen saver" state. Then, when 13 minutes elapse after the printing operation is finished, the LCD 21 is shifted to the "standby power-saving" state from the "screen saver" state. Thereafter, when the opening of the original cover 20 is detected, the scanner section 13 is shifted to the "standby power-supply" state from the standby power-saving" state. When the CD guide operation is detected, the printer section 12 is shifted to the "standby power-supply" state from the "standby power-saving" state.

Next, the "demo display mode" will be described. Before the activation of the hybrid machine 10, it is assumed that a demo display memory card 30 storing the demo display instructing files and the image files are inserted into the slot 31. When the hybrid machine 10 is activated in this state, the hybrid machine 10 effects the "demo display mode." This is because it is judged that the demo display instructing files and the image files exist in the memory card 30.

As shown in FIG. 6B, right after the activation, the printer section 12 and the scanner section 13 are all in the "standby power-supply" state and the LCD 21 is in the "demo display" state. When 3 minutes elapse after the activation, the scanner section 13 is shifted to the "standby power-saving" state and the LCD 21 is kept in the "demo display" state. Thereafter, when the demo printing operation is started by the panel operation, the printer section 12 is shifted to the "printing operation" state, the LCD 21 performs the "in-printing display", and the scanner section 13 is kept in the "standby power-saving" state. The in-printing display in the demo display mode has details showing performances of the hybrid machine 10 and a demo image showing the performances of the hybrid machine 10 to the customers who are interested in the hybrid machine 10 and who try to perform the demo printing operation is displayed unlike the demo display in the non-print state (standby state). The image files for the in-printing display are stored in advance in the memory card 30 and the in-printing display is performed by reading the image files.

When the demo printing operation is finished, the printer section 12 is shifted to the "standby power-supply" state and the LCD 21 is shifted to the "demo display" state. Then, when 3 minutes elapse after the printing operation is finished, the printer section 12 is shifted to the "standby power-saving" state. When any time elapses thereafter, the LCD 21 is kept in the "demo display" state. Even when the opening operation of the original cover 20 is detected, the scanner section 13 is kept in the "standby power-saving" state. Even when the operation of the CD guide is detected, the printer section 12 is kept in the "standby power-saving" state. That is, in the "demo display mode", the scanner section 13 is kept in the "standby power-saving" state even when the original cover 20 is opened and the printer section 12 is kept in the "standby power-saving" state even when the CD guide is operated. The LCD 21 is kept in the "demo display" state to continue to display the demo image, without being shifted to the "menu display", the "screen saver", and the "power-saving."

When in the printer section 12 is in the "standby power-saving" state, the carriage motor 52 or the sheet transporting motor 53 which is, for example, a stepping motor is degaussed into a gear free state. When the carriage motor 52 or the sheet transporting motor 53 is, for example, a DC motor, the power supply to a rotation detecting optical sensor is stopped. Accordingly, when the printer section 12 is restored to the "standby power-supply" state or the "printing operation" state from the "standby power-saving" state, an initial setting operation of operating the carriage is resumed as at the time of turning on the power supply.

When the temperature of the lamp 62 (fluorescent tube) in the scanner section 13 is lowered, the characteristic of the lamp 62 is varied to make the light intensity unstable. Accordingly, when the original cover 20 is opened, the scanner section 13 shifts to in the "standby power-supply" state in the normal mode. However, the scanner section 13 is not used at all in the demo display mode. Accordingly, even when the original cover 20 is opened, it means that a customer merely opens the original cover 20, thereby keeping the scanner section in the "standby power-saving" state. However, even in the "standby power-saving" state, the disk guide sensor 55, the original cover sensor 65, and the operating section 22 which use the detection result or the operation as the state transition requirement are kept in the power-supply state.

In the "demo display mode", the scanner section 13 is kept in the "standby power-saving" state without being shifted to the "standby power-supply" state even when the original cover 20 is operated. Accordingly, the frequency of unnecessarily lighting the lamp 62 is reduced and thus the lifetime of the lamp 62 is not much reduced even though the hybrid machine 10 is exhibited while performing a demo display operation.

As described above, this embodiment provides the following advantages.

(1) In the demo display mode, even when any time elapses in the demo display state, the "standby power-saving" mode is not performed. Accordingly, it is possible to substantially continuously perform the demo display operation, other than at the time of performing the demo printing operation, etc. Therefore, since the time for giving a demonstration of the performances, etc. of the hybrid machine to the customers is increased, the advertisement effect of the hybrid machine 10 is enhanced.

(2) In the demo display mode, since the "menu display" state and the "screen saver" state are not used and the display times therefor can be used for the demo display operation, it is possible to further enhance the advertisement effect by the use of the demo display. One of the "menu display" state and the "screen saver" state may be used. For example, when the "menu display" state is not used, the "screen saver" is used, and a text or illustration showing the performances of the hybrid machine 10 is displayed with the screen saver in demo display, it is possible to further enhance the advertisement effect by the use of the demo display with the screen saver. When the "screen saver" state is not used and the "menu display" state is used, since the LCD is in the "menu display" state in a case where the frequency of performing the printing operation is high after the activation and after the printing operation is finished, the printing operation can be smoothly performed when the activation for the printing operation or when the printing operation is repetitively performed several times. In the demo display mode, since a plurality of images are sequentially displayed, it is possible to prevent the deterioration of the screen of the LCD 21.

(3) When it is judged that the demo display instructing file and the image files are stored in the memory card 30, the demo display mode is performed. Accordingly, when the memory card 30 for demo display storing the demo display instructing file, etc. is prepared in advance and the memory card 30 is inserted into the slot 31 of the hybrid machine 10, it is possible to start the demo display only by activating the hybrid machine 10. Therefore, it is possible to save the labor of the panel operation for changing the mode, which is required to change the normal mode to the demo display mode by the panel operation.

(4) Even when the opening operation of the original cover 20 is detected by the original cover sensor 65, the lamp 62 is not turned on in the demo display mode. Accordingly, it is possible to reduce the operating time of the lamp 62 in the demo display state, compared with the case where the lamp is used for the demo display. Therefore, the lifetime of the lamp 62 of a hybrid machine exhibited in the store is not differ much from that of a new product.

(5) Even when the operation of the CD guide is detected by the disk guide sensor 55, the "standby power-saving" state is maintained in the demo display mode. Accordingly, it is possible to reduce the standby power-supply time of the printer section 12 in the demo display mode, thereby suppressing the decrease in lifetime due to the power-saving of the hybrid machine 10 or the standby power-supply of the motors.

(6) At the time of performing a demo printing operation, since the in-print demo display different from the non-print demo display is performed, it is possible to effectively show the performances of the hybrid machine 10 to the customers who are interested in the hybrid machine 10 and who try to perform the demo printing operation.

Next, a second embodiment of the invention will be described. The second embodiment is different from the first embodiment in the state transition requirements in the demo display mode. The other configurations such as the structure of the hybrid machine 10 are similar to those of the first embodiment and thus only the different points will be described.

Figure 7A:
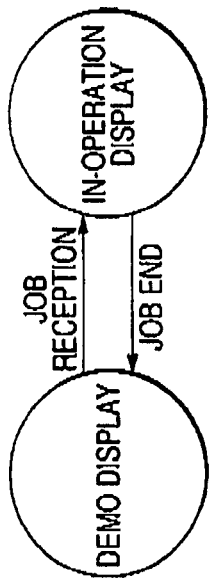
FIGS. 7A to 7C are diagrams respectively showing state transitions of a printer section, a scanner section and an LCD of a hybrid machine according to a second embodiment of the invention, in a demo display mode.
Figure 7B:
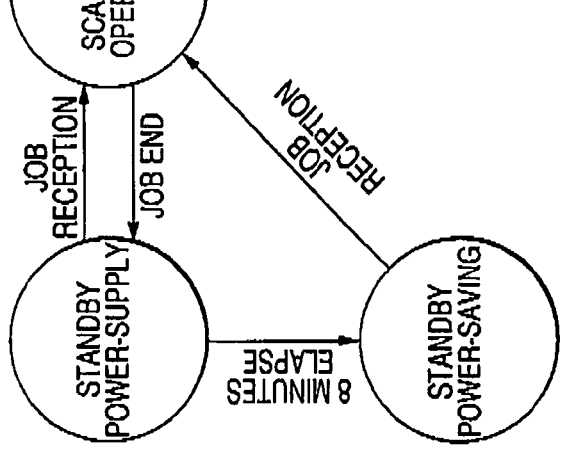
Figure 7C:
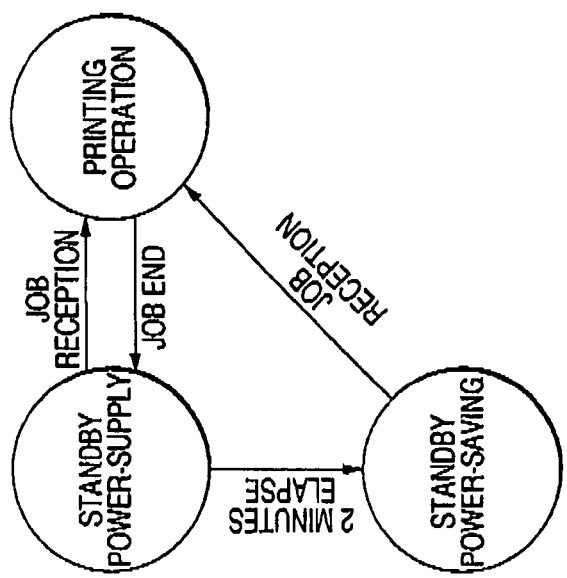

FIGS. 7A to 7C show state transitions of the printer section, the scanner section, and the LCD in the demo display mode. The state transition in the normal mode is the same as the first embodiment. The "demo display mode" according to the second embodiment has many state transition requirements similar to those of the "normal mode" and thus particularly different points will be mainly described.

First, in the state transition of the printer section 12, as shown in FIG. 7A, when the operation of the CD guide is detected in the "standby power-saving" state, the printer section 12 is kept in the "standby power-saving" state without being shifted to the "standby power-supply" state. In the normal mode, when "3 minutes" elapses in the "standby power-supply" state, the printer section is shifted to the "standby power-saving" state. However, in the demo display mode, the time period elapsed until the printer section is shifted to the "standby power-saving" state is "2 minutes." That is, in the demo display mode, the time period elapsed until the "standby power-supply" state is shifted to the "standby power-saving" state is shorter than that in the normal mode. In the other cases, the state transition is similar to that in the normal mode.

Next, in the state transition of the scanner section 13, as shown in FIG. 7B, when the opening operation of the original cover 20 is detected in the "standby power-saving" state, the scanner section 13 is kept in the "standby power-saving" state without being shifted to the "standby power-supply" state. In the normal mode, when "13 minutes" elapses in the "standby power-supply" state, the scanner section is shifted to the "standby power-saving" state, However, in the demo display mode, the time period elapsed until the scanner section is shifted to the "standby power-saving" state is "8 minutes." That is, in the demo display mode, the time period elapsed until the scanner section is shifted to the "standby power-saving" state from the "standby power-supply" state is shorter than that in the normal mode. In the other cases, the state transition is similar to that in the normal mode.

Next, the state transition of the LCD 21 is similar to that of the first embodiment, as shown in FIG. 7C. That is, the change state does not include the "power-saving" and the "menu display" and includes only two states of the "demo display" and the "in-printing display." When the print start operation is performed by the control panel in the "demo display" state to receive a job, the LCD is shifted to the "imprinting display" state. When the job is finished in the "in-printing display" state, the LCD is shifted to the "demo display" state. When any time elapses in the "demo display" state, the LCD is kept in the "demo display" state without being shifted to the "power-saving" state.

Next, how the states are shifted in the "demo display mode" with the lapse of time after the activation will be described with reference to FIG. 8A In the figure, similarly to the first embodiment, the "standby power-supply", the "standby power-saving", and the "printing operation" are briefly referred to as the "power-supply", the "power-saving", and the "printing", respectively.

When the hybrid machine 10 is turned on with the memory card 30 for demo display inserted into the slot 31, it is judged that the demo display instructing file exists in the memory card 30 and thus the hybrid machine 10 is started in the "demo display mode."

As shown in FIG. 8A, right after the activation, the printer section 12 and the scanner section 13 are all in the "standby power-supply" state and the LCD 21 is in the "demo display" state. When 2 minutes elapse after the activation, the printer section 12 is shifted to the "standby power-saving" state. That is, with the lapse of time shorter than 3 minutes in the normal mode, the printer section is shifted to the "standby power-saving" state. Then, when 8 minutes elapse after the activation, the scanner section 13 is shifted to the "standby power-saving" state. That is, with the lapse of time shorter than 13 minutes in the normal mode, the scanner section is shifted to the "standby power-saving" state. The LCD 21 is kept in the "demo display" state. Thereafter, when the demo printing operation is started by the panel operation, the printer section 12 is shifted to the "printing operation" state, the LCD 21 performs the "imprinting display", and the scanner section 13 is kept in the "standby power-saving" state. In the in-printing display in the demo display mode, a demo image showing the performances of the hybrid machine 10 to the customers who are interested in the hybrid machine 10 and who try to perform the demo printing operation is displayed unlike the demo display in the non-print state (standby state).

When the demo printing operation is finished, the printer section 12 is shifted to the "standby power-supply" state and the LCD 21 is shifted to the "demo display" state. Then, when 2 minutes elapse after the printing operation is finished, the printer section 12 is shifted to the "standby power-saving" state. When any time elapses thereafter, the LCD 21 is kept in the "demo display" state. Even when the opening operation of the original cover 20 is detected, the scanner section 13 is kept in the "standby power-saving" state. Even when the operation of the CD guide is detected, the printer section 12 is kept in the "standby power-saving" state. That is, in the "demo display mode", the scanner section 13 is kept in the "standby power-saving" state even when the original cover 20 is opened and the printer section 12 is kept in the "standby power-saving" state even when the CD guide is operated. The LCD 21 is kept in the "demo display" state, without being shifted to the "menu display", the "screen saver", and the "power-saving."

In this way, in the demo display mode, the "standby power-saving" state is entered with the lapse of time in the "standby power-supply" shorter than that in the normal mode. Accordingly, it is possible to enhance the power-saving effect, in addition to the advantages of the first embodiment.

In the example shown in FIG. 8A, the "standby power-supply" state is shifted to the "standby power-saving" state with the lapse of time shorter than that in the normal mode.

However, as shown in FIG. 8B, the time period elapsed in the "standby power-supply" state may be set to zero. For example, the exhibited hybrid machine 10 does not give a demonstration of the scanner section 13, the "standby power-supply" state may not be used and the scanner section may be always kept in the power-saving state on standby. In this case, as shown in FIG. 8B, right after the activation, the scanner section 13 is shifted to the "standby power-saving" state. Accordingly, since the standby power-supply time of the scanner section 13 can be substantially saved, it is possible to further enhance the power-saving effect, in addition to the advantages of the first embodiment.

Next, a third embodiment of the invention will be described. In the third embodiment, regarding the time period elapsed in the "standby power-supply" state until the "standby power-saving" state, the time period elapsed after the printing operation is finished is set shorter than the time period elapsed right after the activation. Specifically, when 3 minutes elapse after the demo printing operation is finished, the "standby power-supply" state is shifted to the "standby power-saving" state. However, when 2 minutes elapse right after the activation, the "standby power-supply" state is shifted to the "standby power-saving" state. In FIGS. 9A and 9B, similarly to the above-mentioned embodiments, the "standby power-supply", the "standby power-saving", and the "printing operation" are briefly referred to as the "power-supply", the "power-saving", and the "printing", respectively.

When the hybrid machine 10 is activated with the memory card 30 for demo display inserted into the slot 31, it is judged that the demo display instructing file exists in the memory card 30 and thus the hybrid machine 10 is thus started in the "demo display mode."

As shown in FIG. 9A, right after the activation, the printer section 12 is in the "standby power-supply" state, the scanner section 13 is in the "standby power-saving" state, and the LCD 21 is in the "demo display" state. When 2 minutes elapse after the activation, the printer section 12 is shifted to the "standby power-saving" state. That is, with the lapse of time of 2 minutes which is shorter than the elapsed time period of 3 minutes for changing the "standby power-supply" state to the "standby power-saving" state after the printing operation is finished, the printer section is shifted to the "standby power-saving" state. Thereafter, when the demo printing operation is started by the panel operation, the printer section 12 is shifted to the "printing operation" state, the LCD 21 performs the "in-printing display", and the scanner section 13 is kept in the "standby power-saving" state.

When the demo printing operation is finished, the printer section 12 is shifted to the "standby power-supply" state and the LCD 21 is shifted to the "demo display" state. Then, when 3 minutes, which is longer than 2 minutes after the activation, elapses after the printing operation is finished, the printer section 12 is shifted to the "standby power-saving" state. When any time elapses thereafter, the LCD 21 is kept in the "demo display" state. Even when the opening operation of the original cover 20 is detected, the scanner section 13 is kept in the "standby power-saving" state. Even when the operation of the CD guide is detected, the printer section 12 maintains the "standby power-saving" state.

In the third embodiment, as shown in FIG. 9B, the elapsed time period in the "standby power-supply" state until the scanner section 13 is shifted to the "standby power-saving" state right after the activation is set shorter than the elapsed time period after the scanning operation is finished. Specifically, when 13 minutes elapse after the scanning operation is finished, the scanner is shifted to the "standby power-saving" state from the "standby power-supply" state, but the elapsed time period right after the activation is set to 0 minute, whereby the scanner section is shifted to the "standby power-saving" state right after the activation.

When the hybrid machine 10 is activated in the "demo display mode", as shown in FIG. 9B, the printer section 12 is in the "standby power-supply" state, the scanner section 13 is in the "standby power-saving" state, and the LCD 21 is in the "demo display" state, right after the activation. When 2 minutes elapse after the activation, the printer section 12 is shifted to the "standby power-saving" state. That is, with the lapse of time of 2 minutes shorter than the elapsed time period of 3 minutes until changing the "standby power-supply" state to the "standby power-saving" state after the printing operation is finished, the printer section is shifted to the "standby power-saving" state. Thereafter, when a copy printing operation is started by the panel operation, the scanner section 13 is shifted to the "copy scanning" state. The scanned image data are converted into print data by the image processor of the controller 40 and the print data are transmitted to the printer section 12, whereby the printer section 12 is shifted to the "printing operation (copy printing operation)" state. During the copy, the LCD 21 performs the "in-printing display (in-copy display)."

When the copy scanning operation is finished, the scanner section 13 is shifted to the "standby power-supply" state and when the copy printing operation is finished, the printer section 12 is shifted to the "standby power-supply" state. When the copy printing operation is finished, the LCD 21 is shifted to the "demo display" state from the "in-printing display-."Then, after the printing operation is finished, the printer section 12 is shifted to the "standby power-saving" state with the lapse of time of 3 minutes longer than the elapsed time period of 2 minutes after the activation. After the scanning operation is finished, the printer section 12 is shifted to the "standby power-saving" state with the lapse of time of 13 minutes longer than the elapsed time period of 0 minute after the activation. Thereafter, when any time period elapses, the LCD 21 is kept in the "demo display" state. Even when the opening operation of the original cover 30 is detected, the scanner section 13 is kept in the "standby power-saving" state. Even when the operation of the CD guide is detected, the printer section 12 is kept in the "standby power-saving" state.

In this way, in the demo display mode, the printer section 12 is shifted to the "standby power-saving" state with the lapse of time of 2 minutes shorter than the elapsed time period of 3 minutes after the printing operation is finished and the scanner section 13 is shifted to the "standby power-saving" state with the lapse of time (0 minute) shorter than the elapsed time period of 13 minutes after the scanning operation is finished. Accordingly, for example, when the hybrid machine 10 is activated when or right after the opening of the store, it is possible to further enhance the power-saving effect by shortening the "standby power-supply" time period right after the activation, that is, when the number of customers is small in the course of preparing for the opening of the store or right after the opening of the store and thus the frequency of performing the demo printing operation (including the copy printing operation) is very low.

Next, a fourth embodiment of the invention will be described. In the fourth embodiment, the state transition requirements in the demo display mode are different. The other configurations such as the structure of the hybrid machine 10 are similar to those of the first embodiment and thus only particularly different points will be described.

Figures 10A, 10B, 10C:
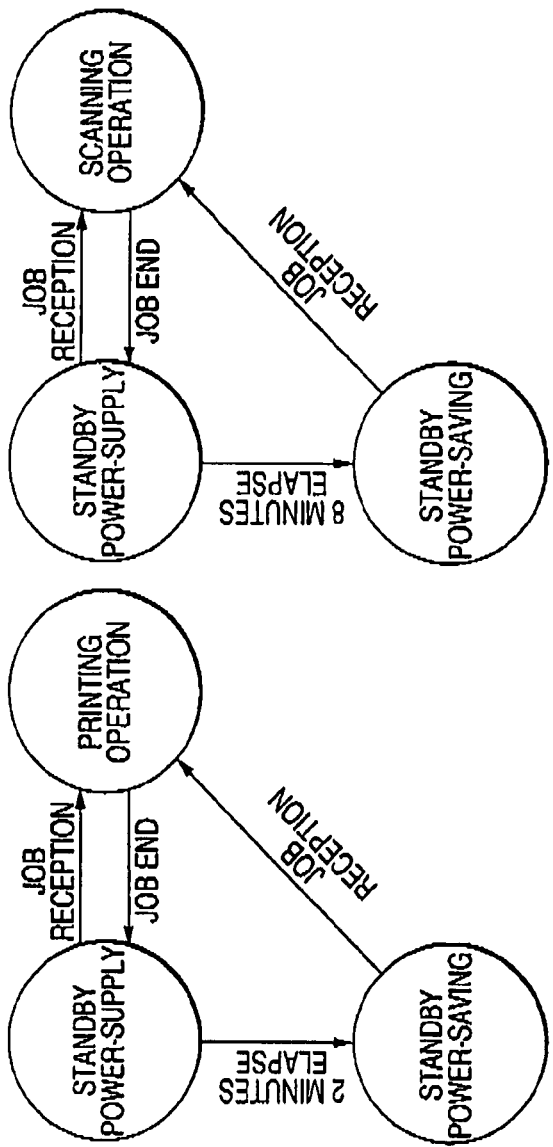
FIGS. 10A to 10C are diagrams respectively showing state transitions of a printer section, a scanner section and an LCD of a hybrid machine according to a fourth embodiment of the invention, in a demo display mode.

FIGS. 10A to 10C show the state transitions of the printer section, the scanner section, and the LCD in the demo display mode. The state transitions in the normal mode are similar to those of the first embodiment. Since there are many state transition requirements similar to those of the "normal mode", particularly different points will be mainly described.

In the state transition of the printer section 12, as shown in FIG. 10A, when the operation of the CD guide is detected in the "standby power-saving" state, the printer section is kept in the "standby power-saving" state without being shifted to the "standby power-supply" state. In the normal mode, when "3 minutes" elapse in the "standby power-supply" state, the printer section is shifted to the "standby power-saving" state. However, in the demo display mode, the elapsed time period until the printer section is shifted to the "standby power-saving" state is shortened to "2 minutes." That is, in the demo display mode, the elapsed time period until the printer section is shifted to the "standby power-saving" state from the "standby power-supply" state is shorter than that in the normal mode. In the other cases, the state transitions are similar to those in the normal mode.

In the state transition of the scanner section 13, as shown in FIG. 10B, when the opening operation of the original cover 20 is detected in the "standby power-saving" state, the scanner section is kept in the "standby power-saving" state without being shifted to the "standby power-supply" state. In the normal mode, when "13 minutes" elapse in the "standby power-supply" state, the scanner section is shifted to the "standby power-saving" state. However, in the demo display mode, the elapsed time period until the scanner section is shifted to the "standby power-saving" state is shortened to "8 minutes". That is, in the demo display mode, the elapsed time period until the scanner section is shifted to the "standby power-saving" state from the "standby power-supply" state is shorter than that in the normal mode. However, in this embodiment, since the scanner section is shifted to the "standby power-saving" state right after the activation, the elapsed time period until the scanner section is shifted to the "standby power-saving" state after the activation is set shorter than the elapsed time period until the scanner section is shifted to the "standby power-saving" state after the scanning operation is finished. Specifically, in this embodiment, the elapsed time period until the scanner section is shifted to the "standby power-saving" state after the activation is set to 0 minutes. In the other cases, the state transition is similar to that in the normal mode.

Next, in the state transition of the LCD 21, as shown in FIG. 10C, the "power-saving" state is not used and only three states of the "menu display", the "demo display", and the "in-operation display" are used. When a job is received in the "demo display" state by receiving a print job from a host computer, a PDA, or the like or pressing the scan switch 28, the LCD is shifted to the "in-operation display" state.

When the job is ended in the "in-operation display" state, the LCD is shifted to the "menu display" state. When 1 minute elapses in the "menu display" state, the LCD is shifted to the "demo display" state. That is, in the normal mode, when 3 minutes elapse after the panel operation is detected and the LCD is shifted to the "menu display" state, the LCD is shifted to the "screen saver" state. However, in this embodiment, when 1 minutes elapse which is shorter than that in the normal mode, the LCD is shifted to the "demo display" state. When the panel is operated in the "demo display" state, the LCD is shifted to the "menu display" state. When a job is received by performing the print start operation, the scanning start operation, or the copy start operation by the panel operation in the "menu display" state, the LCD is shifted to the "in-operation display" state.

Next, how the states are shifted in the "demo display mode" with the lapse of time after the activation will be described with reference to FIG. 11. In the figure, similarly to the above-mentioned embodiments, the "standby power-supply", the "standby power-saving", and the "printing operation" are briefly referred to as the "power-supply", the "power-saving", and the "printing", respectively.

When the hybrid machine 10 is activated with the memory card 30 for demo display inserted into the slot 31, it is judged that the demo display instructing file exists in the memory card 30 and thus the hybrid machine 10 is started in the "demo display mode."

As shown in FIG. 11, right after the activation, the printer section 12 is in the "standby power-supply" state and the scanner section 13 is in the "standby power-saving" state. At this time, the LCD 21 is in the "demo display" state. When 2 minutes elapse after the activation, the printer section 12 is shifted to the "standby power-saving" state. That is, the printer section is shifted to the "standby power-saving" state with the lapse of time shorter than 3 minutes in the normal mode.

Thereafter, when the demo printing operation is started by the panel operation, the LCD 21 is shifted to the "menu display" state and a menu is displayed on the screen of the LCD 21. In this embodiment, at the time of performing the demo printing operation, a desired image can be selected and printed out of a plurality of image data stored in the memory card 30. The desired image is selected on the menu screen by the panel operation. When the image to be printed is selected and determined, a customer's request for the demo printing operation is input to the hybrid machine 10 by pressing the print start switch 24.

When the demo printing operation is started in this way, the printer section 12 is shifted to the "printing operation" state, the LCD 21 performs the "in-printing display", and the scanner section 13 is kept in the "standby power-saving" state. In the in-printing display in the demo display mode, a demo image showing the performances of the hybrid machine 10 is displayed unlike the demo display in the non-print state (standby state).

When the demo printing operation is finished, the printer section 12 is shifted to the "standby power-supply" state and the LCD 21 is shifted to the "demo display" state. Then, when 2 minutes elapse after the printing operation is finished, the printer section 12 is shifted to the "standby power-saving" state. Thereafter, even when any time elapses, the LCD 21 is kept in the "demo display" state. Even when the opening operation of the original cover 20 is detected, the scanner section 13 is kept in the "standby power-saving" state. Even when the operation of the CD guide is detected, the printer section 12 is kept in the "standby power-saving" state. That is, in the "demo display mode", the scanner section 13 is kept in the "standby power-saving" state even when the original cover 20 is opened and the printer section 12 is kept in the "standby power-saving" state even when the CD guide is operated. The LCD 21 is shifted to the "menu display" state when the panel is operated, the "menu display" operation is performed when no other operation is performed, and the LCD is restored to the "demo display" state when 1 minute elapses after the "menu display" is performed, that is, after the panel operation is finally performed. Then, the LCD is kept in the "demo display" state without being shifted to any of the "screen saver" state and the "power-saving" state.

In this way. In the demo display mode, the elapsed time period for changing the "standby power-supply" state to the "standby power-saving" state is shorter than that in the normal mode. That is, the scanner section 13 requires the elapsed time period of 13 minutes in the normal mode, but is shifted to the "standby power-saving" state with the lapse of time of 8 minutes, In the normal mode, the "menu display" of the LCD 21 is shifted to the screen saver state with the lapse of time of 3 minutes and cannot be seen. However, in the demo display mode, the menu display disappears with the lapse of time of 1 minute shorter than that in the normal mode, but the menu display is visible, for 1 minute. Accordingly, since an image to be printed for demonstration can be selected on the menu screen and the display time of the menu screen is shorter than that in the normal mode, it is possible to increase the degree of freedom in selection of an image to be printed for demonstration and to obtain the power-saving effect, in addition to the advantages of the first embodiment.

The above-mentioned embodiments may employ the following modified examples.

(1) Although the above-mentioned embodiments have such a configuration that the demo display instructing file and the image files exist in the memory card 30 and thus the demo display mode is performed, a configuration that the demo display mode is performed by the switch operation of the control panel 14 may be employed. In this case, since functions are assigned in advance to the switches, the demo display mode is performed by operating the switches in a special operation method different from the normal operation method. Examples of the special operation method can include a method of simultaneously operating a plurality of prescribed switches and a method of operating a plurality of prescribed switches in a prescribed order for a prescribed time period interval. When such a special operation is recognized, the controller 40 performs the demo display mode. By using this method, it is possible to perform the demo display mode by the panel operation without adding a switch for demonstration to the control panel 14.

(2) The recording medium as a reading source of the image files for demo display is not limited to the memory card. For example, a configuration that image files are stored in advance in the ROM or a nonvolatile memory in the controller 40 of the hybrid machine 10 and the image files are read and displayed from the ROM or the nonvolatile memory in the demo display mode may be employed.

(3) In the state transition of the scanner section 13 in the demo display mode, the "standby power-supply" state may be disused. In this case, when a job is received in the "standby power-saving" state, the scanner section performs a scanning operation and when the scanning operation is finished, the scanner section is shifted to the "standby power-saving" state. For example, when the hybrid machine 10 is demonstrated on the basis of data stored in the memory card 30, the scanner function is hardly used. Accordingly, it is possible to further enhance the power-saving effect by replacing the "standby power-supply" state of the scanner section 13 with the "standby power-saving" state.

(4) Although the power supply to the printer section 12 or the scanner section 13 is stopped in the "standby power-saving" state, a configuration that the magnitude of the power supply is reduced in the "standby power-supply" state may be employed. In addition, although the LCD 21 is turned off in the "power-saving" state, a configuration that the LCD 21 shifts to darker may be employed.

(5) Although the memory card is used in the above-mentioned embodiments, a configuration that an MO (Magnetic Optical disk) drive and a corresponding CD-R drive or an infrared communication card or a local-area Bluetooth (registered trademark) device is connected as an external storage device and files for demo display and demo print are read therefrom may be employed.

(6) Although the invention is applied to the hybrid machine in the above-mentioned embodiments, the invention may be applied to electronic apparatuses other than the hybrid machine. For example, the invention may be applied to electronic apparatuses such as a printer (ink jet printer, laser printer, and the like), a printer attached to a projection television, and a projector. In addition, the invention may be applied to other electronic apparatuses of a stand alone type.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

The disclosure of Japanese Patent Application No. 2006-3859 filed Jan. 11, 2006 including specification, drawings and claims is incorporated herein by reference in its entirety.

What is claimed is:

1. An electronic apparatus, comprising:
a power supply;
a display;
an actuator, adapted to be actuated by an operator;
an operating section, configured to perform a prescribed operation;
a mode selector, operable to select either a first display mode or a second display mode; and
a controller, operable to cause each of the display and the operating section to be placed in either a first power mode in which a first level of power supplied from the power supply is consumed or a second power mode in which a second level of power supplied from the power supply which is lower than the first level is consumed, and operable to cause the display to display a first image in a case where the first display mode is selected, and to display a second image different from the first image in a case where the second display mode is selected, wherein:
the controller is operable to cause the operating section to transit from the first power mode to the second power mode when the operating section does not perform the prescribed operation for a first time period;
the controller is operable to cause the display to transit from the first power mode to the second power mode at least one of when the operating section does not perform the prescribed operation for a prescribed time period and when the actuator is not actuated for a prescribed time period; and
the controller is operable to disable the display from transiting from the first power mode to the second power mode in a case where the second display mode is selected.

2. The electronic apparatus as set forth in claim 1, wherein:
the controller is operable to cause the operating section to transit from the first power mode to the second power mode when the operating section does not perform the prescribed operation for a second time period shorter than the first time period, in a case where the second display mode is selected.

3. The electronic apparatus as set forth in claim 1, wherein:
the controller is operable to cause the operating section to transit from the first power mode to the second power mode when a second time period shorter than the first time period is elapsed after the electronic apparatus is activated, in a case where the second display mode is selected.

4. The electronic apparatus as set forth in claim 1, wherein:
the prescribed operation is a printing operation with respect to either a sheet medium or a disk medium.

5. The electronic apparatus as set forth in claim 4, wherein:
the actuator includes a member operable to perform the printing operation with respect to the disk medium;
the controller is operable to cause the operating section to transit from the second power mode to the first power mode when the member is actuated, in a case where the first display mode is selected; and
the controller is operable to disable the operating section from transiting from the second power mode to the first power mode even when the member is actuated, in a case where the second display mode is selected.

6. The electronic apparatus as set forth in claim 1, wherein:
the prescribed operation is a scanning operation with respect to an original.

7. The electronic apparatus as set forth in claim 6, wherein:
the controller is operable to cause the operating section to transit from the first power mode to the second power mode immediately after the second display mode is selected.

8. The electronic apparatus as set forth in claim 6, wherein:
the actuator includes a cover adapted to hold the original;
the controller is operable to cause the operating section to transit from the second power mode to the first power mode when the cover is actuated, in a case where the first display mode is selected; and
the controller is operable to disable the operating section from transiting from the second power mode to the first power mode even when the cover is actuated, In a case where the second display mode is selected.

9. The electronic apparatus as set forth in claim 1, wherein:
the actuator includes a switch provided in a control panel together with the display; and
the controller is operable to cause the display to display the first image when the switch is actuated, even in a case where the second display mode is selected.

10. The electronic apparatus as set forth in claim 9, wherein:
the controller is operable to cause the display to display the second image when the switch is not actuated for a prescribed time period while the first image is displayed.

* * * * *